Figure 1:
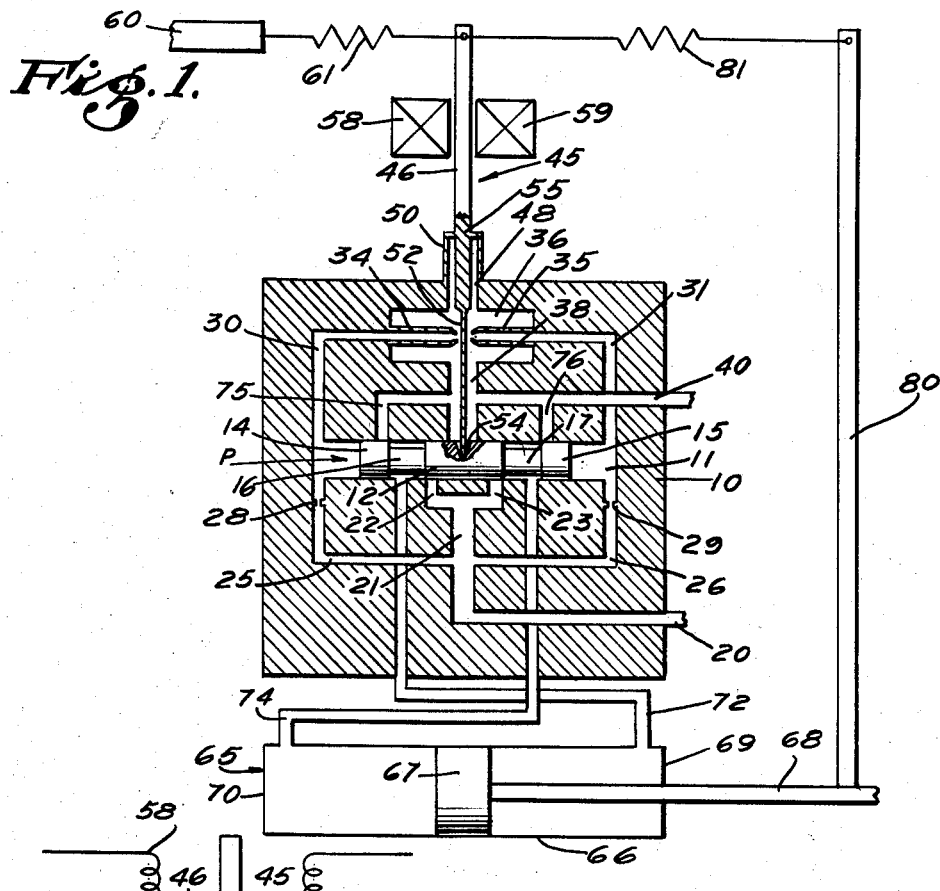

Aug. 2, 1960  G. T. BALTUS ET AL  2,947,286
INTEGRATED ACTUATOR
Filed Jan. 29, 1958

GEORGE T. BALTUS
MARTIN P. WOLPIN
INVENTORS

WHANN & McMANIGAL
Attorneys for Applicant

United States Patent Office

2,947,286
Patented Aug. 2, 1960

2,947,286

INTEGRATED ACTUATOR

George T. Baltus and Martin P. Wolpin, Tonawanda, N.Y., assignors to Bell Aerospace Corporation Filed Jan. 29, 1958, Ser. No. 711,865

26 Claims. (Cl. 121—41)

This invention relates generally to servomechanisms, and relates more particularly to servomechanisms for hydraulic control systems, this application being a continuation-in-part of the Baltus et al. application, Serial No. 647,255, filed March 20, 1957.

Servo valve mechanisms for controlling hydraulic actuators have been used but certain problems have been encountered therein due to the complexity of the mechanisms and the weight thereof.

It is, therefore, an object of the present invention to provide an improved integrated servo valve and power control valve mechanism of simplified construction.

It is another object of the invention to provide mechanism of this character having greatly improved overall reliability.

Still another object of the invention is to provide mechanism of this character having improved feedback means.

A further object of the invention is to provide mechanism of this character of relatively light weight.

A still further object of the invention is to provide mechanism of this character that is relatively inexpensive to manufacture.

Another object of the invention is to provide mechanism of this character wherein maintenance costs are relatively low.

The characteristics and advantages of the invention are further sufficiently referred to in connection with the following detailed description of the accompanying drawings which represent certain embodiments. After considering these examples, skilled persons will understand that variations may be made without departing from the principles disclosed and I contemplate the employment of any structures, arrangements or modes of operation that are properly within the scope of the appended claims.

Figure 2:
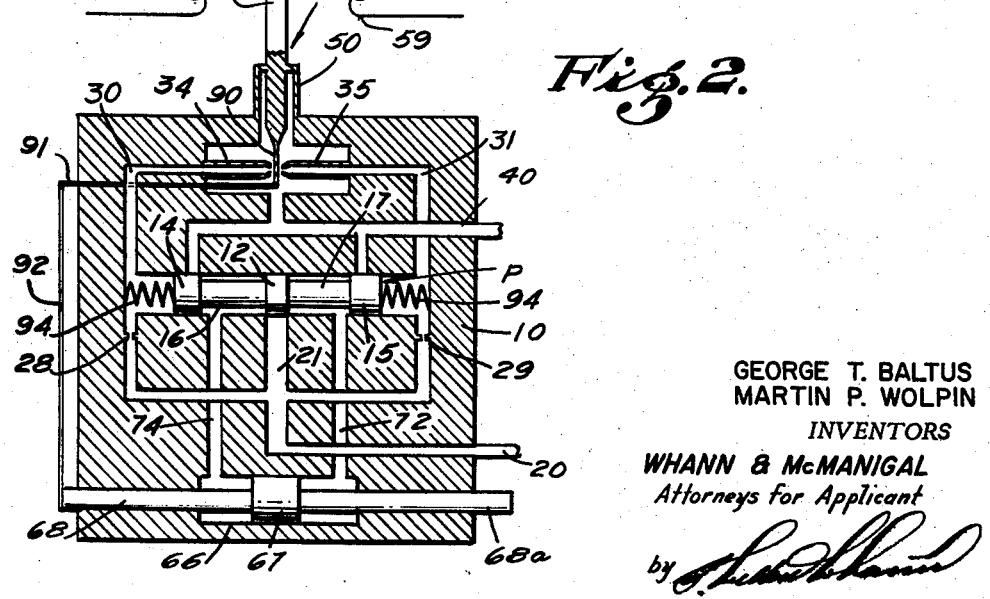

Referring to the drawings:

Fig. 1 is a schematic sectional view of a servo and actuator mechanism embodying the present invention; and Fig. 2 is a schematic view of an alternative arrangement thereof.

Referring more particularly to Fig. 1, there is shown a housing 10 having a bore 11 therein for a power valve P comprising a central valve spool 12 and end valve spools 14 and 15 in axial alignment with the valve spool 12, said valve spools 14 and 15 being connected to the central valve spool 12 by axially arranged reduced diameter parts 16 and 17.

The mechanism is supplied with fluid pressure by means of a conduit 20 connected with a source of pressure fluid, not shown. Conduit 20 communicates with a conduit 21 which is provided with oppositely arranged branches 22 and 23 communicating with the bore 11 adjacent the longitudinal center thereof and when the power valve is in the neutral or centered position, as shown in Fig. 1, the discharge ends of the branch conduits 22 and 23 are closed by the central spool 12, it being noted that the ends of said spool 12 just cover the respective discharge ends of said branch conduits. There are also conduits 25 and 26 which form a part of the hydraulic system which, for convenience of terminology, will be termed the control system, said conduits 25 and 26 being connected to the pressure fluid supply, said conduits being shown as connected to the conduit 21. Conduits 25 and 26 are connected to the outer ends respectively of the bore 11 and upstream of such connections the conduits 25 and 26 are provided with restricted orifices 28 and 29 respectively. Conduits 25 and 26 are also connected by conduits 30 and 31 respectively, with oppositely arranged nozzles 34 and 35 which are located within a chamber 36 in the housing, said nozzles 34 and 35 having their adjacent ends open and spaced apart. Because of the orifices 28 and 29, the fluid pressure between said orifices and the respective nozzles is substantially the same so that the respective ends of the power valve P are subjected to equal pressures and said valve is hydraulically balanced.

Connecting the chamber 36 and bore 11 is a bore 38 which communicates with said bore 11 adjacent the longitudinal center thereof and the adjacent end of said bore 38 is closed by the central spool 12. A pressure fluid return line 40 is provided and is connected to the bore 38 so that pressure fluid discharged through the nozzles 34 and 35 may return to a suitable reservoir or the like by way of the chamber 36, bore 38 and said return line 40.

Control of the discharge of fluid from the nozzles 34 and 35 is controlled by a flapper valve, indicated generally at 45, and including a stem 46 which has its lower end extending into a bore 48 from the chamber 36 to the exterior of the housing, said bore 48 being of substantially greater diameter than the diameter of the stem to permit operative movements of said stem. The lower end portion of stem 46 is sealed to prevent leakage therepast by means of a tubular, isolation diaphragm 50 which provides a flexible pivotal support for said stem as well as a seal therefor. The inner or lower end of the stem, as shown in Fig. 1, carries a leaf spring 52 which extends longitudinally of the lower end of said stem and is disposed between the open ends of the nozzles 34 and 35 and is normally positioned a substantially equal distance from said open ends. The spring 52 extends downwardly through the chamber 36 and bore 38, the lower end portion of said spring being received in a V-shaped recess in the upper side of the central spool 12 of the power valve. The lower end of said spring is disposed at the bottom of the V-shaped recess 54 so that the power valve will be moved with movements of the spring and such movements will not be interfered with by reason of the wider open end of said recess.

Various means may be used to actuate the valve 45 by actuation of the upper portion of the stem 46 which pivots at the isolation diaphragm, the stem 46 being movable clockwise and counterclockwise, as viewed in Fig. 1, to move the spring 52, which functions as a feed back, toward and away from the open ends of the nozzles 34 and 35 and also to effect corresponding shifting of the power valve. One means for actuating the valve 45 comprises a torque motor including the coils 58 and 59. One or the other of said coils will be energized by a suitable electrical signal to cause the upper end of said stem to be moved toward the energized coil. Another means for effecting actuation of said stem comprises a mechanical means which includes a rod 60 connected to the upper end of the stem 46 by means of a spring 61 and tensioning or loosening of the force of spring 61 on said stem will result in a corresponding movement of the valve 45.

The above described mechanism controls a hydraulic actuator, indicated generally at 65 and said actuator includes a power control cylinder 66 in which is operably disposed a piston 67 which is normally located adjacent the longitudinal center of said cylinder. The piston 67 has a piston rod 68 which extends outwardly of one end of the cylinder 66 and is axially arranged relative to said cylinder and piston. Suitable packing is provided in the end wall 69 of the cylinder 66 through which the piston rod 68 extends, the opposite end of said cylinder 66 being closed by a wall 70.

Means for actuating the piston 67 by hydraulic pressure is provided and comprises conduits 72 and 74 which have connections with the cylinder 66 adjacent the left and right hand ends thereof as shown in Fig. 1. The opposite ends of said conduits are connected with the bore 11 at points between the spool 14 and the spool 12 and the spool 15 and the spool 12 respectively. The bore 11 has additional connections with the return line 40, said connections being indicated at 75 and 76. The connections 75 is connected to the bore 11 at a point normally covered by the spool 14 and at the inner end thereof while the connection 76 communicates with the bore 11 at a point normally covered by the spool 15 and closely adjacent the inner end thereof, and connects with the line 40 downstream of the bore 38, the connection 75 communicating with said bore 38.

There is also a second feedback means which includes a bar 80 connected at one end to the outer end of the piston rod 68 and extending upwardly to terminate at a point substantially level with the upper end of the stem 46. A resilient connection is provided between the upper end of the rod 80 and the upper end of the stem 46, said connection including a spring 81.

It is to be understood, of course, that the piston rod 68 is connected to a mechanism to be actuated by the actuator 65 and control of said actuator may be by various means which will actuate the stem 46 of the valve 45. Where the control of the valve 45 is by electrical means, such as the coils 58 and 59, the stem is of a material which will be magnetically attracted by either of said coils when energized.

Assuming the valve 45 is electrically controlled an electrical input signal is transmitted from a suitable sensing device to one or the other of said coils 58 and 59. Should the coil 58 be provided with such input signal, the stem 46 is attracted toward said coil in accordance with the value of said signal and said stem will be moved counterclockwise, pivoting at the isolation diaphragm 50 so that the spring 52 will move toward the open end of the nozzle 35 and restrict outflow of fluid therefrom so that there is a build up of fluid pressure downstream of the restricted orifice 29. Hence, there is an unbalancing of the pressures applied to the respective ends of the valve P and as the pressure at the right-hand side is greater than that at the left-hand side, said valve will move toward the left. This movement of the power valve P will effect opening of the passage 23 so that pressure fluid will flow into the bore portion between the spools 12 and 15, into the passage 74 and thence, into the left-hand end of the cylinder with which said passage is connected. Hydraulic pressure is then applied to the piston 67 to move same toward the right. Simultaneously with the connecting of the left-hand end of the cylinder 66 with the source of fluid pressure, the passage 75 is also opened so that fluid from the right-hand end of the cylinder 66 may leave same through the conduit 72, the space between the spools 12 and 14, passage 75, the bore 38, and the return line 40.

The operation of the feedback spring 52 is described in the above referred to application, Serial No. 647,255. More particularly this movement or displacement of the valve P produces a bending moment in said feedback spring 52 resulting in a torque force on the stem 46 in opposition to the electrical torque applied to said stem or armature 46 tending to center said stem, that is, to return it to the neutral position.

Cooperating with the action of the spring 52 as a feedback is the second feedback means connected directly with the actuator. Thus, with movement of the piston 67 to the right, the tension of spring 81 on the stem 46 is increased and when said piston 67 has moved a sufficient distance to cause the tension of spring 81 in combination with the force of spring 52 to counterbalance the force of the input signal to the coil 58, the valve 45 will return to the normal neutral position whereat the flow of fluid from the nozzles is returned to normal and the fluid pressure acting on the ends of the valve P is of equal value so that the valve P is again in balance as far as fluid pressure is concerned. The springs 52 and 81 then return the valve P to its neutral position whereupon the piston 67 is retained in its new position as fluid pressure is cut off from the actuator 65 and the outflow of fluid from the cylinder 66 is also cut off.

Should the input signal be supplied to the coil 59, the reverse operation will occur to effect movement of the piston 67 toward the left.

Mechanical control of the valve 45 is also provided and includes the mechanically actuated member 60 which, when actuated toward or away from the stem 46 will cause slacking of the tension of spring 61 on said stem or the increasing of said tension.

Assuming the movement of the member 60 is leftward, as shown in Fig. 1, there will be an increase in the tension of spring 61 on said stem 46 so as to cause the latter to rotate in the counterclockwise direction. Thereafter the operation of the mechanism will be substantially the same as above described in connection with the electrical control. Should the reverse operation be desired, the member 60 is moved toward the right and the stem is thereupon moved clockwise by reason of the spring 81 and the operation of the mechanism is thereafter similar to the reverse operation of the mechanism when under the electrical control.

The arrangement shown in Fig. 2 is similar in many respects to the arrangement shown in Fig. 1 and only the differences will be particularly described and pointed out.

The power actuator is incorporated in the housing 10 and includes the cylinder 66 and piston 67. A piston rod 68 extends from one side of the piston 67 and there is a second piston rod 68A which extends from the opposite end of the piston 67 and may be connected to a mechanism to be actuated by the power actuator.

In place of the spring 52 of the arrangement shown in Fig. 1, the stem 46 is provided with a flat blade 90 at the inner end for controlling the flow of fluid from the nozzles 34 and 35. The lower end of the blade 90 is connected to a rod 91 which extends outwardly of the housing 10 and is connected at its outer end with the adjacent end of a spring 92 having its opposite end connected with the piston rod 68. The spring 92 performs the function of the spring 81 of the Fig. 1 arrangement and the mechanism is provided with a torque motor having the respective coils 58 and 59.

Instead of the spring 52 of the Fig. 1 arrangement, the Fig. 2 arrangement is provided with a pair of coil springs 94 in the respective ends of the bore 11, said springs acting in opposite directions on the power valve to normally maintain said valve in the neutral position. It is also to be noted that in both arrangements there is a direct connection between the actuator and the pilot valve 45.

Operation of the Fig. 2 arrangement is similar to the operation of the arrangement shown in Fig. 1 except there is only one feedback system which includes the spring 92. More particularly when the stem or armature 46 is actuated by one or the other of the torque motor coils 58, 59 said stem will be moved accordingly to restrict the flow of fluid from one or the other of the nozzles 34, 35. Should the stem be rotated counterclockwise, discharge of fluid from the nozzle 35 will be restricted to build up a pressure for moving the valve P leftwardly to thereby connect the right-hand side of the cylinder 66 with the source of pressure fluid to actuate the piston 67 leftwardly. The leaf spring 92 will flex with leftward movement of the piston rod 68 and when the tension of said spring 92 is sufficient to overcome the force of the input signal on the stem 46, the valve 45 will be returned to the initial or neutral position. When the valve 45 has been thus returned to said neutral position, the pressure in the control system, downstream of the orifices 28 and 29, will return to their balancing value so that the pressure at opposite ends of the valve P are the same so that the springs 94 will center said valve P which is then in its neutral position.

While only the electrical signal control arrangement is disclosed in Fig. 2, it is to be understood that other types of control for the valve 45 may be used such as the mechanical mechanism disclosed in the arrangement of Fig. 1 or any other suitable control.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the embodiments hereinbefore described being merely for the purposes of illustration.

I claim:

1. In a control mechanism for a hydraulic control system: a fluid-pressure actuator mechanism adapted to be connected to a device to be actuated, said actuator having a part movable in opposite directions; a fluid pressure conduit system connected with said actuator mechanism for applying fluid pressure to selectively operate said part in opposite directions; a power valve mechanism in said fluid pressure conduit system for controlling same, said power valve mechanism normally shutting off fluid flow relative to said actuator, but operable to respective positions for supplying pressure fluid to said actuator to actuate said part in one or the other directions of movement; pilot valve means having a neutral position, said pilot valve means being operably connected by means of a feedback spring with said power valve and selectively responsive to control signals to effect operative movements of said power valve toward said respective positions; and second feedback means, including yielding means, connecting the actuator mechanism with said pilot valve means and operable by the actuator mechanism for returning the pilot valve means to the neutral position.

2. In a control mechanism for a hydraulic control system: a fluid-pressure actuator mechanism adapted to be connected to a device to be actuated, said actuator mechanism being operable in opposite directions; a fluid pressure system connected with said actuator mechanism for applying fluid pressure to operate same in opposite directions; a power valve mechanism in said fluid pressure system and normally shutting off fluid flow relative to said actuator, but operable to respective positions for supplying pressure fluid to said actuator to actuate same in one or the other directions of movement; pilot valve means operably connected with said power valve, said pilot valve means having a neutral position and selectively responsive to control signals to effect operative movement of said power valve; and means resilient operable by the actuator mechanism for returning the pilot valve to the neutral position.

3. In a control mechanism: a fluid-pressure actuator mechanism; a fluid pressure system connected with said actuator mechanism for applying fluid pressure to operate same; a power valve mechanism normally shutting off fluid flow relative to said actuator, but operable to respective positions for supplying pressure fluid to said actuator to actuate same; pilot valve means having a neutral position, said pilot valve means being hydraulically connected with said power valve mechanism and selectively responsive to control signals to hydraulically control said power valve mechanism and thereby effect operative movements of said power valve mechanism; and means operable by the actuator mechanism for effecting return of the pilot valve to the neutral position.

4. In a servomechanism for hydraulic control systems and the like: a fluid-pressure actuator adapted to be connected to a device to be actuated; a primary fluid system connected to said actuator for supplying pressure fluid to actuate said actuator in opposite directions; valve means controlling said primary fluid system and including a movable valve part, and yielding means urging said valve part to a neutral position whereat primary pressure fluid is shut off relative to said actuator, said valve part being normally subjected to oppositely exerted balanced fluid pressures but movable in respective directions by unbalancing of said fluid pressures to effect corresponding movements of said actuator; pilot valve means having a neutral position and operable to selectively unbalance the fluid pressures to said valve part to effect corresponding movement thereof; means for selectively applying a control command to said pilot valve to effect operable movement thereof; and mechanical feed back means interconnecting said actuator and said pilot valve means to move the latter to a neutral position when said actuator attains a position of response to said control command.

5. In a control mechanism: a hydraulic fluid pressure system including fluid ports; a hydraulically actuated power valve mechanism controlling said fluid ports; pilot valve means hydraulically connected with said power valve mechanism and selectively responsive to control signals to hydraulically control said power valve mechanism and thereby effect operative movements of said power valve mechanism; and means operable by the power valve mechanism for effecting return of the pilot valve means to an initial position.

6. In a control mechanism: a fluid pressure actuator mechanism; a fluid pressure system connected with said actuator mechanism supplying pressure fluid to operate same; a power valve mechanism controlling said fluid pressure system; pilot valve means controlling said power valve mechanism responsive to control signals to effect operative movements of said power valve mechanism; and resilient means operable by the actuator mechanism for effecting movement of the pivot valve to a predetermined position.

7. A servomechanism for hydraulic control systems and the like, comprising: a fluid pressure actuator adapted to be connected to a device to be actuated; a primary fluid system connected to said actuator for supplying pressure fluid to actuate said actuator in opposite directions; valve means controlling said primary fluid system and including a movable valve part, said valve part being normally subjected to oppositely exerted balanced fluid pressures but movable in respective directions by unbalancing of said fluid pressures to effect corresponding movements of said actuator; pilot valve means having a neutral position and operable to selectively unbalance the fluid pressures to said valve part to effect corresponding movement thereof; yielding means interconnecting said pivot valve means and said valve part, said yielding means urging said valve part to a neutral position whereat primary pressure fluid is shut off relative to said actuator; means for selectively applying a control command to said pilot valve to effect operable movement thereof; and mechanical feed back means interconnecting said actuator and said pilot valve means to move the latter to a neutral position when said actuator attains a position of response to said control command.

8. A servomechanism for hydraulic control systems and the like, comprising: a fluid pressure actuator adapted to be connected to a device to be actuated; a primary fluid system connected to said actuator for supplying pressure fluid to actuate said actuator in opposite directions; valve means controlling said primary fluid system and including a movable valve part subjected to oppositely exerted balanced fluid pressures but movable in respective directions by unbalancing of said fluid pressures to effect corresponding movements of said actuator; pilot valve means having a neutral position and operable to selectively unbalance the fluid pressures to said valve part to effect corresponding movement thereof; yielding means interconnecting said pilot valve means and said valve part, said yielding means urging said valve part to a neutral position whereat primary pressure fluid is shut off relative to said actuator; mechanical means for selectively applying a control command to said pilot valve to effect operable movement thereof; and mechanical feed back means interconnecting said actuator and said pilot valve means to move the latter to a neutral position when said actuator attains a position of response to said control command.

9. A servomechanism for hydraulic control systems and the like, comprising: a fluid pressure actuator adapted to be connected to a device to be actuated; a primary fluid system connected to said actuator for supplying pressure fluid to actuate said actuator in opposite directions; valve means controlling said primary fluid system and including a movable valve part subjected to oppositely exerted balanced fluid pressures but movable in respective directions by unbalancing of said fluid pressures to effect corresponding movements of said actuator; pilot valve means having a neutral position and operable to selectively unbalance the fluid pressures to said valve part to effect corresponding movement thereof; yielding means interconnecting said pilot valve means and said valve part, said yielding means urging said valve part to a neutral position whereat primary pressure fluid is shut off relative to said actuator; electrical means for selectively applying a control command to said pilot valve to effect operable movement thereof; and mechanical feed back means interconnecting said actuator and said pilot valve means to move the latter to a neutral position when said actuator attains a position of response to said control command.

10. A servomechanism for hydraulic control systems and the like, comprising: a fluid pressure actuator adapted to be connected to a device to be actuated; a primary fluid system connected to said actuator for supplying pressure fluid to actuate said actuator in opposite directions; valve means controlling said primary fluid system and including a movable valve part, and yielding means urging said valve part to a neutral position whereat primary pressure fluid is shut off relative to said actuator but movable in respective directions by unbalancing of said fluid pressures to effect corresponding movements of said actuator; a secondary fluid pressure system having conduits supplying fluid pressure of equal value ot said valve part so that the latter is balanced by said pressure, said fluid pressure system including a pair of nozzles having openings through which fluid flows; pilot valve means having a neutral position and operable to selectively control the openings in said nozzles to unbalance the fluid pressures to said valve part to effect corresponding movement thereof; means for selectively applying a control command to said pilot valve to effect operable movement thereof; and mechanical feed back means interconnecting said actuator and said pilot valve means to move the latter to a neutral position when said actuator attains a position of response to said control command.

11. In a control mechanism: a fluid pressure actuator mechanism; a fluid pressure system connected with said actuator mechanism for applying fluid pressure to operate same; a power valve mechanism controlling said fluid pressure system; pilot valve means hydraulically connected with said power valve mechanism and selectively responsive to control signals to hydraulically control said power valve mechanism and thereby effect operative movements of said power valve mechanism; and means directly connecting the actuator with the pilot valve means to move the latter to a neutral position when said actuator attains a position of response to a control command.

12. In a control mechanism: a fluid-pressure actuator mechanism; a fluid pressure system connected with said actuator mechanism for applying fluid pressure to operate same; a power valve mechanism normally shutting off fluid flow relative to said actuator, said power valve mechanism including a movable valve member with oppositely arranged pressure areas of equal size and normally subjected to fluid pressures of equal value, said power valve mechanism being operable to respective positions for supplying pressure fluid to said actuator to actuate same; pilot valve means having a neutral position and selectively responsive to control signals to vary one of the equal pressures on said valve member and thus effect operative movements of said power valve mechanism; and feedback means operable by said power valve for effecting return of the pilot valve to the neutral position.

13. In a control mechanism for a fluid-pressure actuator mechanism: a fluid pressure system adapted to be connected with said actuator mechanism; a power valve mechanism having oppositely arranged fluid pressure areas, said power valve mechanism normally shutting off fluid flow in said system, but operable to respective positions for providing fluid flow in said system; pilot valve means including a pair of oppositely arranged fluid nozzles and fluid connections between said nozzles and respective pressure areas, said pilot valve means including a flapper valve having a neutral position between said nozzles and selectively responsive to control signals to effect operative movements of said power valve mechanism; and means directly connected with said pilot valve means for effecting return of the pilot valve to the neutral position.

14. In a servomechanism for hydraulic control systems and the like: a primary fluid system including a pair of passageway means for connection with and the supply of pressure fluid to an actuator adapted to be actuated in opposite directions, the pressure in said pair of passageway means normally being balanced; means, including a fluid actuated movable control member adapted to be moved in opposite directions to unbalance the pressure in said pair of passageway means depending upon the direction of movement of said control member; a second fluid pressure system including a pair of nozzles, respective branch passageway means being adapted to receive pressure fluid from a source of such fluid, each of said branch passageway means being connected with a respective nozzle; a restricted orifice in each of said branch passageway means upstream of the respective nozzles; a flapper valve for controling the flow of fluid from said nozzles; and signal responsive means controlling the movement of the flapper valve toward and away from respective nozzles.

15. In a servomechanism for hydraulic control systems and the like: a primary fluid system including a pair of passageway means for connection with and the supply of pressure fluid to a part adapted to be actuated in opposite directions in accordance with the pressure differential in said pair of passageway means, the pressure in said pair of passageway means normally being balanced; means, operably connected to said pair of passageway means, including a pressure actuated movable control member adapted to be moved in opposite directions to unbalance pressure in said pair of passageway means depending upon the direction of movement of said control member; a second fluid pressure system including a pair of nozzles, respective branch passageway means being adapted to receive pressure fluid to a source of such fluid, each of said branch passageway means being connected with a respective nozzle; a calibrated restricted orifice in each of said branch passageway means anterior to the respective nozzles; and a flapper valve movable toward and away from respective nozzles for controlling the flow of fluid from said nozzles.

16. In a control mechanism for hydraulic control systems and the like: a fluid pressure actuator mechanism adapted to be connected to a device to be actuated, said actuator mechanism having a part with opposed pressure areas and being operable in opposite directions; a primary fluid pressure system including supply passageway means for pressure fluid and a pair of passageway means for connection with said actuator adapted to supply actuating fluid to respective pressure areas of said part, the pressures in said pair of passageway means being normally balanced; means, including a pressure actuated movable control member adapted to be moved in opposite directions to control the pressure to said passageway means and to unbalance said pressures therein in accordance with the direction of movement of said control member; a second fluid pressure system including a pair of fluid discharge nozzles; respective passageway means adapted to receive pressure fluid from a source of such fluid, each of said branch passageway means being connected with respective nozzles; a restricted orifice in each of said branch passageway means anterior to the respective nozzles; a flapper valve for controlling the flow of fluid from said nozzles; signal responsive means controlling the movement of the flapper valve toward and away from respective nozzles in accordance with signals thereto; and feedback means connecting said actuator part with said flapper valve.

17. In a control mechanism for hydraulic control systems and the like: a fluid pressure actuator mechanism having a movable part with oppositely arranged pressure areas; a primary fluid pressure system including supply passageway means for pressure fluid and a pair of working pressure passageway means adapted to receive fluid from said supply passageway, said pair of passageway means being connected with said actuator and adapted to supply working fluid to said opposite pressure areas respectively, the pressures in said pair of passageway means being normally balanced; means controlling the pressures in said pair of passageway means, including a pair of fluid discharge nozzles independently connected to said supply passageway means, the pressures in said pair of passageway means being controlled in accordance with the flow of fluid from said nozzles respectively; and flapper valve means for controlling the flow of fluid from said nozzles.

18. In a servomechanism for hydraulic control systems and the like: valve means having fluid ports for pressure fluid and a movable valve part controlling fluid flow through said ports, said valve part having a neutral position closing at least some of said ports, said valve part being normally subjected to oppositely exerted balanced fluid pressures on oppositely arranged equal pressure areas but movable in respective directions by unbalancing of said fluid pressures; pilot valve means having a neutral position and operable to selectively unbalance the fluid pressures to said valve part to effect corresponding movement thereof; means for selectively applying a control command to said pilot valve to effect operable movement thereof; and feedback means interconnecting said valve part and said pilot valve means.

19. In a control mechanism for a hydraulic control system: a primary fluid pressure system including a pair of conduits for working fluid, the pressure in said pair of conduits normally being balanced; a movable control member for controlling the pressure of fluid in said pair of conduits, said control member having oppositely arranged pressure areas; fluid pressure conducting means adapted to subject said pressure areas to normally balanced fluid pressures, said pressures being applied independently to respective areas; a pair of independently acting fluid discharge nozzles for said pressure conducting means, there being a nozzle for each pressure area; and means for varying the discharge of fluid from said nozzles relative to each other to unbalance the pressures to said areas.

20. In a control mechanism: a fluid-pressure actuator mechanism; a fluid pressure system connected with said actuator mechanism for applying fluid pressure to operate same; a power valve mechanism normally shutting off fluid flow relative to said actuator, but operable to respective positions for supplying pressure fluid to said actuator to actuate same; pilot valve means having a neutral position, said pilot valve means being hydraulically connected with said power valve mechanism and selectively responsive to control signals to effect operative movements of said power valve mechanism; means operable by the actuator mechanism for urging return of the pilot valve to the neutral position; and means operable by the power valve mechanism urging return of the pilot valve to the neutral position.

21. In a control mechanism: a fluid-pressure actuator mechanism; a fluid pressure system connected with said actuator mechanism for applying fluid pressure to operate same; a power valve mechanism normally shutting off fluid flow relative to said actuator, but operable to respective positions for supplying pressure fluid to said actuator to actuate same; pilot valve means having a neutral position, said pilot valve means being hydraulically connected with said power valve mechanism and selectively responsive to control signals to hydraulically control said power valve mechanism and thereby effect operative movements of said power valve mechanism; and external feed back means between the actuator mechanism and the pilot valve.

22. In a servomechanism for hydraulic control system and the like: valve means having fluid ports for pressure fluid and a movable valve part controlling fluid flow through said ports, said valve part having a neutral position and being normally subjected to oppositely exerted balanced fluid pressures on oppositely arranged equal pressure areas but movable in respective directions by unbalancing said fluid pressures; pilot valve means having a neutral position and operable to selectively unbalance the fluid pressures to said valve part to effect corresponding movement thereof; and feedback means interconnecting said valve part and said pilot valve means.

23. In a control mechanism for hydraulic control system: a fluid pressure system; a movable control member for controlling the pressure of fluid in said system, said control member having oppositely arranged pressure areas; fluid pressure conducting means adapted to subject said pressure areas to normally balanced fluid pressures, said pressures being applied independently to respective areas, a pair of independently acting fluid discharge nozzles for said pressure conducting means, there being a nozzle for each pressure area; and means for varying the discharge of fluid from said nozzles relative to each other to unbalance the pressures to said areas; and feedback means between said movable control member and the means for varying the discharge of fluid from said nozzles.

24. In a control mechanism for a hydraulic control system: a fluid pressure system; a movable control member for controlling the pressure of fluid in said system, said control member having oppositely arranged pressure areas; fluid pressure conducting means adapted to subject said pressure areas to normally balanced fluid pressures, said pressures being applied independently to respective areas; a pair of independently acting fluid discharge nozzles for said pressure conducting means, there being a nozzle for each pressure area; and means for varying the discharge of fluid from said nozzles relative to each other to unbalance the pressures to said areas; and mechanical feedback means between said movable control member and the means for varying the discharge of fluid from said nozzles.

25. In a servomechanism for hydraulic control systems and the like: valve means having fluid ports for pressure fluid and a movable valve part controlling fluid flow through said ports, said valve part having a neutral position and being normally subjected to oppositely exerted balanced fluid pressures on oppositely arranged equal pressure areas but movable in respective directions by unbalancing said fluid pressures; pilot valve means having a neutral position and operable to selectively unbalance the fluid pressures to said valve part to effect corresponding movement thereof; and resilient feedback means interconnecting said valve part and said pilot valve means.

26. In a servomechanism for hydraulic control systems and the like: valve means having fluid ports for pressure fluid and a movable valve part controlling fluid flow relative to said ports, said valve part having a neutral position and being normally subjected to oppositely exerted balanced fluid pressure on oppositely arranged equal pressure areas but movable in respective directions by unbalancing said fluid pressure; pilot valve means having a neutral poistion and operable to selectively unbalance the fluid pressures to said valve part to effect corresponding movement thereof; and internal feedback means interconnecting said valve part and said pilot valve means.

References Cited in the file of this patent

UNITED STATES PATENTS

| | | |
|---|---|---|
| 2,503,447 | May | Apr. 11, 1950 |
| 2,570,624 | Wyckoff | Oct. 9, 1951 |
| 2,641,228 | Adams | June 9, 1953 |
| 2,722,198 | Macgeorge | Nov. 1, 1955 |
| 2,738,772 | Richter | Mar. 20, 1956 |
| 2,790,427 | Carson | Apr. 30, 1957 |
| 2,835,265 | Brandstadter | May 20, 1958 |
| 2,860,606 | Ainsworth | Nov. 18, 1958 |
| 2,886,010 | Hayos et al. | May 12, 1959 |
| 2,889,815 | Lloyd | June 9, 1959 |

OTHER REFERENCES

Model 410 Servovalve; Raymond Atchley, Inc. (Printing date unknown).